(12) United States Patent
Yamamoto et al.

(10) Patent No.: US 10,543,943 B2
(45) Date of Patent: Jan. 28, 2020

(54) ULTRASONIC SEALING APPARATUS FOR USE IN BAG FILLING AND PACKAGING MACHINE

(71) Applicant: Toyo Jidoki Co., Ltd., Minato-ku, Tokyo (JP)

(72) Inventors: Kazunori Yamamoto, Iwakuni (JP); Yasuyuki Honda, Iwakuni (JP); Noriyuki Yamane, Iwakuni (JP)

(73) Assignee: Toyo Jidoki Co., Ltd, Tokyo (JP)

( * ) Notice: Subject to any disclaimer, the term of this patent is extended or adjusted under 35 U.S.C. 154(b) by 0 days.

(21) Appl. No.: 15/671,042

(22) Filed: Aug. 7, 2017

(65) Prior Publication Data

US 2017/0334590 A1    Nov. 23, 2017

Related U.S. Application Data

(62) Division of application No. 14/250,354, filed on Apr. 10, 2014, now abandoned.

(30) Foreign Application Priority Data

May 31, 2013   (JP) .................................. 2013-114863
Nov. 15, 2013   (JP) .................................. 2013-236822

(51) Int. Cl.
*B29C 65/08*      (2006.01)
*B65B 51/22*      (2006.01)
(Continued)

(52) U.S. Cl.
CPC ............ *B65B 51/225* (2013.01); *B29C 65/08* (2013.01); *B29C 65/7882* (2013.01);
(Continued)

(58) Field of Classification Search
CPC ............................. B65B 51/225; B29C 65/08
(Continued)

(56) References Cited

U.S. PATENT DOCUMENTS 3,350,944 A * 11/1967 De Michele ............. A61B 5/03
                                                                   128/903
3,717,539 A    2/1973 Roberts
(Continued)

FOREIGN PATENT DOCUMENTS

DE         8437603 U1    8/1986
DE        20206429 U1    6/2002
(Continued)

OTHER PUBLICATIONS

Japanese Patent Office Action dated Jun. 7, 2016 to Japanese Application No. 2013-236822 with English language translation.

*Primary Examiner* — Andrew M Tecco
*Assistant Examiner* — Eyamindae C Jallow
(74) *Attorney, Agent, or Firm* — Daniel P. Burke; Daniel P. Burke & Associates, PLLC

(57) ABSTRACT

A horn and an anvil are moved toward and away from each other by axially reciprocating a driving rod and thereby reciprocatingly rotating a forked lever in a predetermined angle range. The horn and the anvil are moved toward and pressed against each other with a predetermined force with a bag mouth b held therebetween. A sensor detects the position of a second mounting block secured to the rear end of a sliding shaft of the anvil, thereby detecting the distance between respective pressing surfaces of the horn and the anvil, i.e. the thickness m of a portion of the bag mouth held between the pressing surfaces. When the thickness m is not less than a predetermined threshold value M, a vibrator is activated to perform sealing. When the thickness m is less than the threshold value M, no sealing is performed.

7 Claims, 12 Drawing Sheets

(51) Int. Cl.
*B65B 43/16* (2006.01)
*B65B 43/46* (2006.01)
*B65B 51/14* (2006.01)
*B29C 65/00* (2006.01)
*B29C 65/78* (2006.01)
*B65B 57/02* (2006.01)
*B29L 31/00* (2006.01)

(52) U.S. Cl.
CPC .... *B29C 66/1122* (2013.01); *B29C 66/43121* (2013.01); *B29C 66/8224* (2013.01); *B29C 66/8225* (2013.01); *B29C 66/83221* (2013.01); *B29C 66/849* (2013.01); *B29C 66/9231* (2013.01); *B29C 66/92311* (2013.01); *B65B 43/16* (2013.01); *B65B 43/465* (2013.01); *B65B 51/146* (2013.01); *B65B 57/02* (2013.01); *B29C 66/8242* (2013.01); *B29C 66/8746* (2013.01); *B29L 2031/7128* (2013.01)

(58) Field of Classification Search
USPC ..................................... 53/79; 156/73.1, 358
See application file for complete search history.

(56) References Cited

U.S. PATENT DOCUMENTS

| | | | | |
|---|---|---|---|---|
| 4,241,560 A * | 12/1980 | Deimel | ................... | B29C 65/08 53/374.9 |
| 4,560,427 A * | 12/1985 | Flood | ................... | B29C 65/08 156/250 |
| 4,631,685 A | 12/1986 | Peter | | |
| 4,928,513 A * | 5/1990 | Sugihara | ............... | G01N 27/12 338/34 |
| 5,242,529 A * | 9/1993 | Riedel | ................... | B23K 20/10 156/580.1 |
| 5,357,423 A * | 10/1994 | Weaver | ................... | B23K 20/10 228/1.1 |
| 5,425,826 A * | 6/1995 | Sayyadi | ................... | B29C 53/40 156/267 |
| 5,606,844 A | 3/1997 | Takagaki | | |
| 5,927,046 A * | 7/1999 | Martin | ................... | B29C 65/08 156/580.1 |
| 6,169,394 B1 * | 1/2001 | Frazier | ............... | G01N 27/4473 324/692 |
| 6,835,257 B2 | 12/2004 | Perrine | | |
| 2004/0025474 A1 * | 2/2004 | Hiramoto | ............... | B29C 65/08 53/434 |
| 2008/0236105 A1 * | 10/2008 | Brormann | ............... | B29C 65/08 53/469 |
| 2009/0250171 A1 | 10/2009 | Wieduwilt et al. | | |
| 2012/0111475 A1 | 5/2012 | Ippers et al. | | |
| 2012/0285130 A1 | 11/2012 | Kamigaito | | |
| 2012/0311975 A1 | 12/2012 | Kamigaito | | |
| 2013/0240153 A1 | 9/2013 | Hull | | |

FOREIGN PATENT DOCUMENTS

| | | |
|---|---|---|
| DE | 102004013048 A1 | 9/2005 |
| DE | 102005059004 A1 | 6/2007 |
| DE | 102010039000 A1 | 2/2012 |
| EP | 1388494 A2 | 2/2004 |
| EP | 2147774 A1 | 1/2010 |
| EP | 2532594 A1 | 12/2012 |
| EP | 2743060 A1 | 6/2014 |
| JP | S60-080900 | 6/1985 |
| JP | 05345356 A | 12/1993 |
| JP | 2004-331109 | 11/2004 |
| JP | 2004331109 A | 11/2004 |
| JP | 2010-505626 | 2/2010 |
| JP | 2012-236618 | 12/2012 |

* cited by examiner

ULTRASONIC SEALING APPARATUS FOR USE IN BAG FILLING AND PACKAGING MACHINE

RELATED APPLICATION DATA

This application is a divisional of U.S. patent application Ser. No. 14/250,354 filed on Apr. 10, 2014, which is hereby incorporated by reference.

BACKGROUND OF THE INVENTION

Technical Field

The present invention relates to a sealing apparatus for use in a bag filling and packaging machine in which a bag is held by being gripped at its laterally opposite side edges with a pair of laterally spaced grippers, and the bag held in this way is moved intermittently or continuously along a predetermined path to sequentially undergo predetermined packaging processes such as opening of the bag mouth, filling of an article to be packaged into the bag, and sealing of the bag mouth. More particularly, the present invention relates to an ultrasonic sealing apparatus using ultrasonic waves to perform sealing.

Background Art

An ultrasonic sealing apparatus using ultrasonic waves is known as a sealing apparatus for use in a bag filling and packaging machine. Ultrasonic sealing has the advantage that, even if foreign matter is bitten between the inner surfaces of a seal portion of a bag during the sealing process, it is possible to cut off the foreign matter by ultrasonic vibration and hence possible to prevent biting of foreign matter. In addition, unlike heat sealing, the ultrasonic sealing requires no heat source. In the ultrasonic sealing, a bag to be sealed is pressed between a horn and an anvil, and in this state, the horn is ultrasonically vibrated to seal the bag. In this regard, if the sealing apparatus is activated with no bag held between the horn and the anvil, i.e. if an "idle sealing" operation is performed, the metallic horn abuts directly against the hard metallic anvil, and in this state, ultrasonic vibration is applied to the horn. Accordingly, there is a danger that a part of the apparatus may be cracked or flawed. That is, the apparatus itself may be damaged. Such a situation will not occur when a bag to be sealed is normally held between the horn and the anvil because the bag acts as a buffer. The conventional practice to prevent an "idle sealing" operation is to detect whether or not a bag to be sealed is present with a sensor or the like at a position upstream the sealing step in the bag moving direction and to control the operation carried out at the subsequent steps on the basis of a detection signal from the sensor or the like. That is, when the presence of a bag cannot be confirmed, no sealing operation is performed at the sealing step. Such control is performed not only in a packaging machine performing ultrasonic sealing but also in a packaging machine performing heat sealing using a pair of hot plates.

However, after the presence of a bag has been detected with the sensor, the bag may be displaced downward relative to the pair of grippers or slip off the grippers under the influence of an impact due to filling of an article to be packaged, or mechanical vibration applied to the bag when moved, or inertia force acting on the bag at the time of starting or stopping the movement of the bag. Further, the bag mouth may be undesirably folded downward when the bag mouth is tensed at the deaeration step or the like. In such cases, the operation of the sealing apparatus results in an "idle sealing" operation despite the fact that the bag detecting operation using a sensor or the like has been carried out. Therefore, the conventional method cannot prevent completely an "idle sealing" operation of the ultrasonic sealing apparatus. Thus, there is a danger of the ultrasonic sealing apparatus being damaged.

Japanese Examined Patent Publication No. Sho 53-23755 or Japanese Patent Laid-Open Publication No. Sho 59-142925, for example, discloses a technique of performing some detection at the sealing step and controlling the sealing operation based on the result of the detection. In the packaging machines disclosed in the above-described publications, prior to carrying out sealing, it is detected whether or not a bag moved to the sealing step has been filled with an article to be packaged, and if the bag has not yet been filled, sealing is not carried out. However, sealing apparatuses used in these packaging machines are heat sealing apparatuses. Unlike the ultrasonic sealing apparatus, the heat sealing apparatus will have no problem on the apparatus itself even if an "idle sealing" operation is performed. In addition, the packaging machines disclosed in the above-described publications are configured to detect whether or not a bag has been filled with an article to be packaged on the basis of a part of the bag bulging with the article filled therein by moving a detecting member. Therefore, any bag having been filled with the article is detected to be good even if the bag is out of position in the up-and-down direction, and sealing is performed undesirably.

Japanese Patent Laid-Open Publication No. Hei 1-182230 discloses a heat sealing apparatus in which, when heat sealing is to be performed with a pair of hot plates, the distance between the mutually opposing hot plates is measured, and if the measured distance is greater than a predetermined distance, it is judged that foreign matter has been bitten, and the operator is informed of the detection of a defective by issuing an alarm, for example. With this apparatus, however, biting of foreign matter is detected only after heat sealing has been performed, and the apparatus cannot perform control as to whether or not to carry out heat sealing.

SUMMARY OF THE INVENTION

The present invention has been made in view of the above-described problems associated with the background art.

Accordingly, an object of the present invention is to provide an ultrasonic sealing apparatus for use in a bag filling and packaging machine, which is capable of surely preventing an "idle sealing" operation.

The present invention provides an ultrasonic sealing apparatus having the following structure. The ultrasonic sealing apparatus is for use in a bag filling and packaging machine in which a bag is held by being gripped at its laterally opposite side edges with a pair of laterally spaced grippers, and the bag held in this way is moved along a predetermined path to sequentially undergo predetermined packaging processes. The ultrasonic sealing apparatus includes an ultrasonic sealing apparatus body having a horn and an anvil which are movable toward and away from each other. The ultrasonic sealing apparatus body is disposed at a predetermined sealing step position in the bag filling and packaging machine. The ultrasonic sealing apparatus further includes a sensor disposed at the sealing step position to detect whether or not the mouth of a bag moved to the sealing step position is in a predetermined sealing enable position between the horn and the anvil. Further, the ultrasonic sealing apparatus includes a control unit controlling the ultrasonic sealing apparatus body on the basis of a signal from the sensor.

The ultrasonic sealing apparatus may be arranged as follows. The sensor detects the distance between respective pressing surfaces of the horn and the anvil that press the bag when the horn and the anvil are pressed against each other with the mouth of the bag held therebetween. The control unit judges that the mouth of the bag is in the sealing enable position when the distance detected by the sensor is not less than a threshold value, and controls the ultrasonic sealing apparatus body to apply ultrasonic vibration to the horn. When the distance detected by the sensor is less than the threshold value, the control unit judges that the mouth of the bag is not in the sealing enable position, and controls the ultrasonic sealing apparatus body not to apply ultrasonic vibration to the horn.

Further, the horn and the anvil may move in linkage with each other. The sensor may detect the distance between the pressing surfaces by detecting the position of one of the horn and the anvil.

Further, the arrangement may be as follows. The ultrasonic sealing apparatus body has a box-shaped frame supporting the horn and the anvil. A driving mechanism for operating the horn and the anvil is disposed in the frame. The sensor is disposed in the frame and configured to detect the position of a detecting member moving together with the anvil.

Further, the arrangement may be as follows. The sensor is provided at a position corresponding to a lower-limit position where the edge of the mouth of the bag lies when the bag mouth is at a lower limit of the sealing enable position. The control unit judges, when the sensor detects the presence of the bag at the lower-limit position, that the mouth of the bag is in the sealing enable position, and judges, when the sensor does not detect the presence of the bag at the lower-limit position, that the mouth of the bag is not in the sealing enable position.

In another embodiment of the present invention, the anvil is secured, through an insulator, to an anvil support member advancing and retracting relative to the horn. The sensor is a detection sensor that is electrically connected to the horn and the anvil through respective wirings to detect electrical conduction between the horn and the anvil or a change in electric resistance occurring between the horn and the anvil when the horn and the anvil move to respective positions closest to each other. When the detection sensor does not detect the electrical conduction or a change in the electric resistance, the control unit judges that the mouth of the bag is in the sealing enable position, and controls the ultrasonic sealing apparatus body to apply ultrasonic vibration to the horn. When the detection sensor detects the electrical conduction or a change in the electric resistance, the control unit judges that the mouth of the bag is not in the sealing enable position, and controls the ultrasonic sealing apparatus body not to apply ultrasonic vibration to the horn.

In still another embodiment, the ultrasonic sealing apparatus further includes a disconnection detecting device detecting a disconnection in the wirings connecting the horn and the anvil to the detection sensor. When the disconnection detecting device detects a disconnection in the wirings, the control unit judges that the mouth of the bag is not in the sealing enable position, and controls the ultrasonic sealing apparatus body not to apply ultrasonic vibration to the horn.

In a further embodiment, the detection sensor detects a change in electric resistance, and the disconnection detecting device has a resistor electrically connected between the horn and the anvil. The resistor constitutes a closed circuit, together with the horn, the anvil, the detection sensor, and the wirings connecting the horn and the anvil to the detection sensor. When the detection sensor does not detect a change in the electric resistance, the control unit judges that the bag is in the sealing enable position. When the detection sensor detects a change in the electric resistance, the control unit judges that the bag is not in the sealing enable position.

In a still further embodiment, the ultrasonic sealing apparatus has a variable resistor connected between the detection sensor and one of the horn and the anvil.

In addition, the present invention provides an intermittently rotating bag filling and packaging machine including an ultrasonic sealing apparatus having the above-described structure.

As has been stated above, according to the present invention, the sensor disposed at the sealing step position detects, before performing sealing, whether or not the bag is in the sealing enable position, and the ultrasonic sealing apparatus body is controlled on the basis of a signal from the sensor. Therefore, it is possible to surely prevent an "idle sealing" operation and hence possible to prevent a damage to the ultrasonic sealing apparatus. Further, the ultrasonic sealing apparatus according to the present invention may be arranged to detect the distance between respective pressing surfaces of the horn and the anvil that press the bag when the horn and the anvil are pressed against each other with the mouth of the bag held therebetween. With this structure, it is possible to surely detect displacement or folding of the bag mouth due to some cause during the movement of the bag to the position for sealing by the horn and the anvil, and hence possible to prevent an "idle sealing" operation.

The ultrasonic sealing apparatus may be arranged as follows. The anvil is secured, through an insulator, to an anvil support member advancing and retracting relative to the horn. The sensor is a detection sensor that is electrically connected to the horn and the anvil through respective wirings to detect electrical conduction between the horn and the anvil or a change in electric resistance occurring between the horn and the anvil when the horn and the anvil move to respective positions closest to each other. When the detection sensor does not detect the electrical conduction or a change in the electric resistance, the control unit judges that the mouth of the bag is in the sealing enable position, whereas, when the detection sensor detects the electrical conduction or a change in the electric resistance, the control unit judges that the mouth of the bag is not in the sealing enable position. With this structure, unlike the structure that detects a mechanical gap between the horn and the anvil when coming closest to each other, the ultrasonic sealing apparatus is independent of a mechanical play or the like and hence excellent in detection accuracy and responsiveness and capable of speeding up the sealing operation.

The ultrasonic sealing apparatus may further include a disconnection detecting device detecting a disconnection in the wirings connecting the horn and the anvil to the detection sensor. With this structure, when the disconnection detecting device detects a disconnection in the wirings, the control unit judges that the mouth of the bag is not in the sealing enable position, and controls the ultrasonic sealing apparatus body not to apply ultrasonic vibration to the horn, thereby making it possible to even more surely and stably prevent a damage to the ultrasonic sealing apparatus due to an "idle sealing" operation.

If the disconnection detecting device is formed by using a resistor electrically connected between the horn and the anvil, a disconnection in the wirings can be detected with a simple structure.

If a variable resistor is provided between the detection sensor and one of the horn and the anvil, it is possible to adjust the sensitivity of the detection sensor and hence possible to even more surely prevent a damage to the ultrasonic sealing apparatus due to an "idle sealing" operation.

Other objects and advantages of the present invention will become apparent from the following detailed description of illustrated embodiments of the invention.

BRIEF DESCRIPTION OF THE DRAWINGS

FIG. 8 is a sectional side view of an ultrasonic sealing apparatus according to a third embodiment of the present invention when the ultrasonic sealing apparatus is standing by.

DETAILED DESCRIPTION OF THE PREFERRED EMBODIMENTS

Embodiments of the present invention will be explained below with reference to the accompanying drawings. It should, however, be noted that the following embodiments are for illustrative purposes only, and that the scope of the present invention is not limited to these embodiments.

Figure 1:
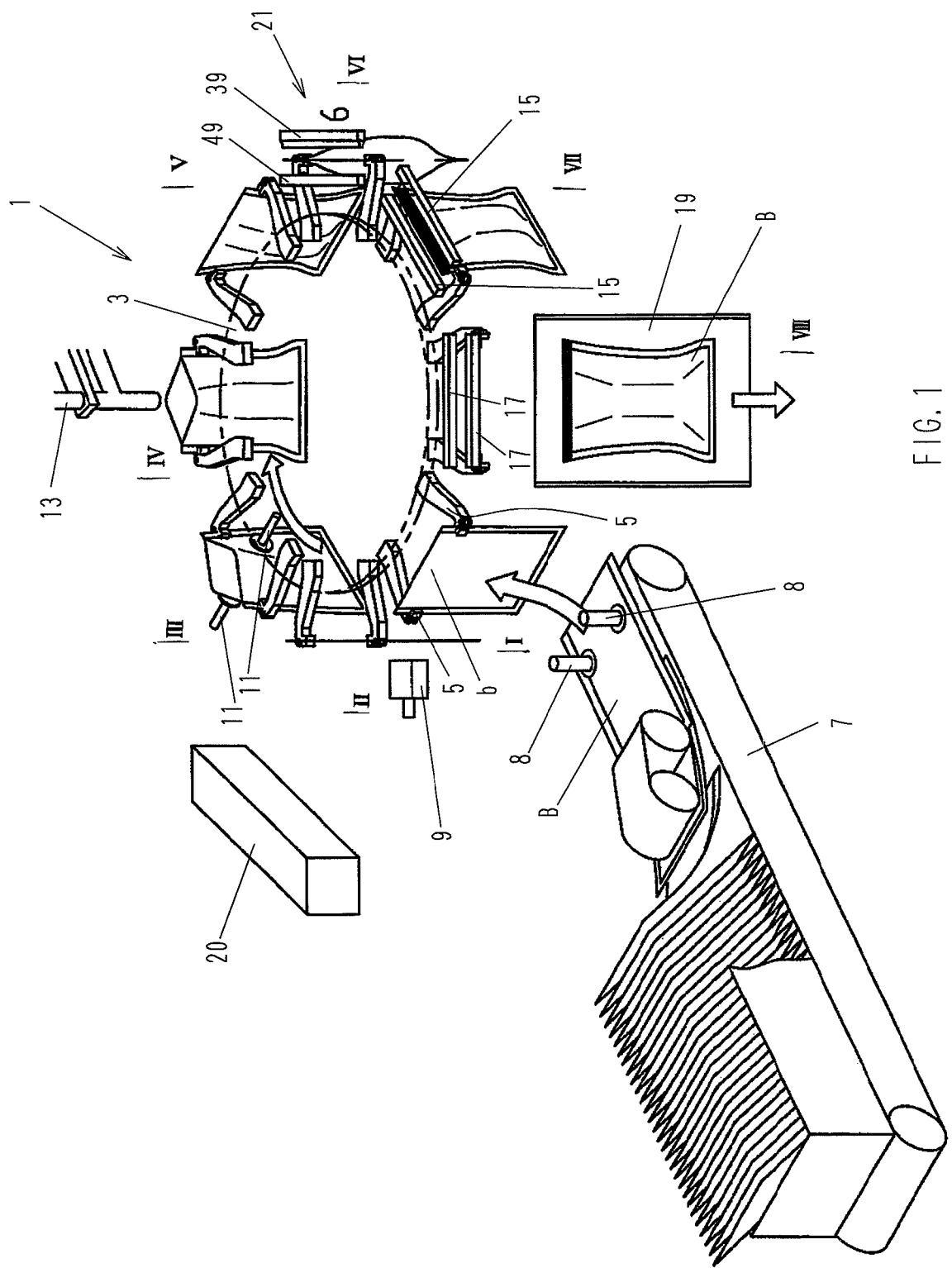
FIG. 1 is a perspective view showing the overall structure of a bag filling and packaging machine using an ultrasonic sealing apparatus according to the present invention.

FIG. 1 is a perspective view showing the overall structure of an intermittently rotating bag filling and packaging machine 1 using an ultrasonic sealing apparatus according to the present invention. Although the present invention will be explained below by way of an example in which the present invention is applied to an intermittently rotating bag filling and packaging machine, it should be noted that the application of the present invention is not limited thereto, but the present invention is also applicable to a continuously moving type bag filling and packaging machine. The posture of a bag when held with a pair of grippers is not limited to an upright position (vertical bag filling and packaging machine). The present invention is also applicable to a system in which a bag is held with a pair of grippers in a sideways lying position (horizontal bag filling and packaging machine). It should be noted that bags having been ultrasonically sealed by using the ultrasonic sealing apparatus according to the present invention may further undergo other processes appropriately according to need, e.g. decorative sealing by a heat sealing device, and cooling of the heat-sealed portion by a cooling device.

In FIG. 1, reference numeral 1 denotes an intermittently rotating bag filling and packaging machine (hereinafter referred to as simply "packaging machine"). The packaging machine 1 has an intermittently rotating rotary table 3 and a plurality of pairs of laterally spaced grippers 5 attached to the outer periphery of the rotary table 3. Each pair of grippers 5 grip a bag B at the laterally opposite side edges of the latter. As the rotary table 3 rotates intermittently, the pair of grippers 5, together with the bag B held as stated above, move along a circular path while stopping at predetermined stations sequentially. At a station I, a bag feeding step is carried out. At the station I, a publicly known conveyor magazine 7 is disposed. Bags B are taken out from the conveyor magazine 7 one by one by a pair of suction cups 8 and delivered to a pair of grippers 5 in an upright position. At a subsequent station II, the bag B is printed with data, e.g. the date of manufacture, by a printer 9. At a station III, the mouth b of the bag B is opened by using a pair of mouth opening suction cups 11. At a station IV, the bag B is filled with a liquid material to be packed through a nozzle 13. At a station V, the pair of grippers 5, which have been moved toward each other to open the bag mouth b at the station III, are moved away from each other to bring the bag mouth b into a tensed state. At a station VI, the bag B is ultrasonically sealed by an ultrasonic sealing apparatus 21 (hereinafter referred to as simply "sealing apparatus 21") having a horn 39 and an anvil 49, which will be explained later. At a station VII, the bag B is decoratively sealed by using a pair of hot plates 15. At a station VIII, the sealed portion of the bag B is cooled by using a pair of cooling plates 17. Thereafter, the bag B is discharged onto a finished bag discharge chute 19. Reference numeral 20 denotes a control unit controlling the operation of the whole packaging machine 1, including the sealing apparatus 21 (explained later).

Figure 2:
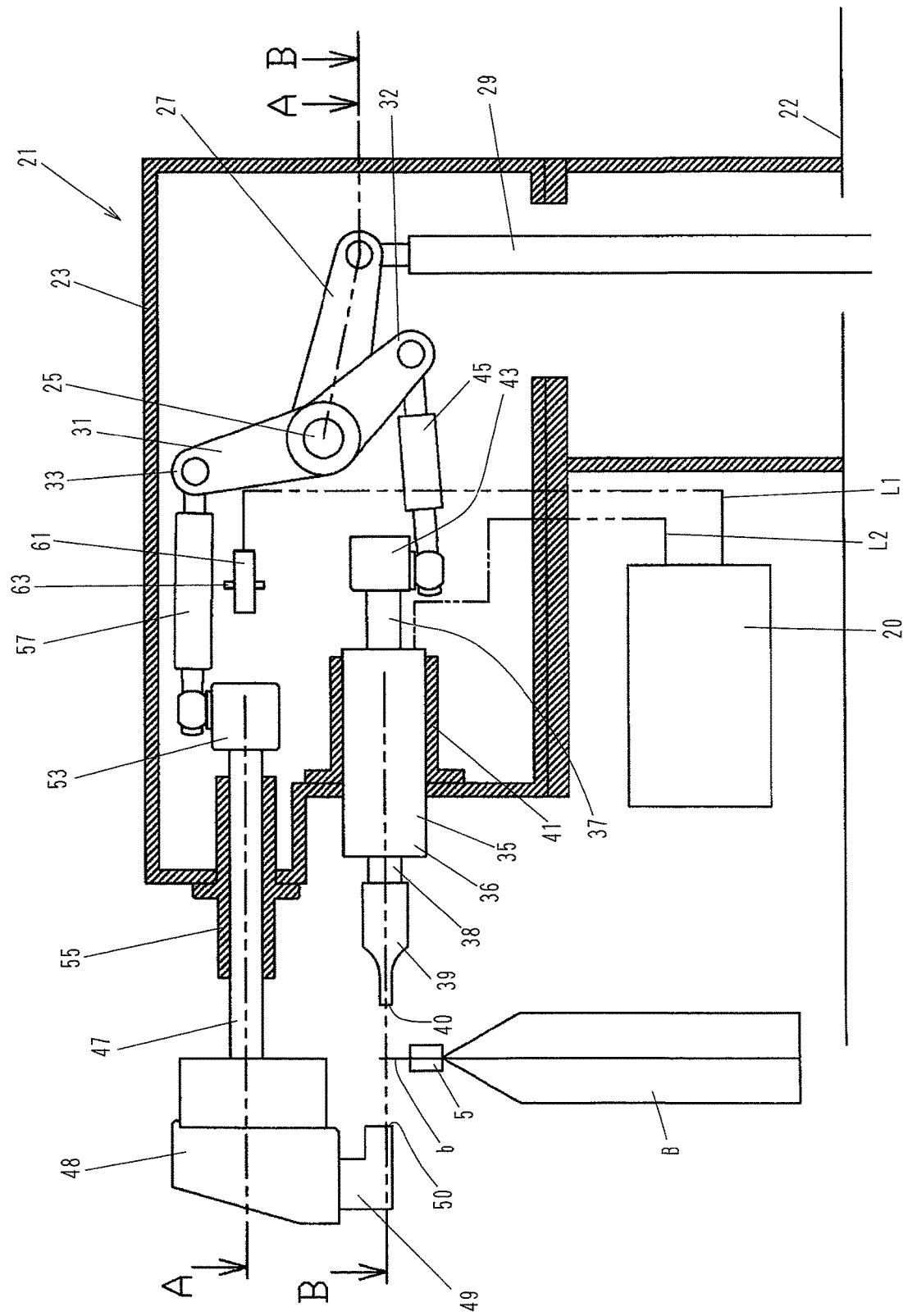
FIG. 2 is a sectional side view of an ultrasonic sealing apparatus according to a first embodiment of the present invention.
Figure 3:
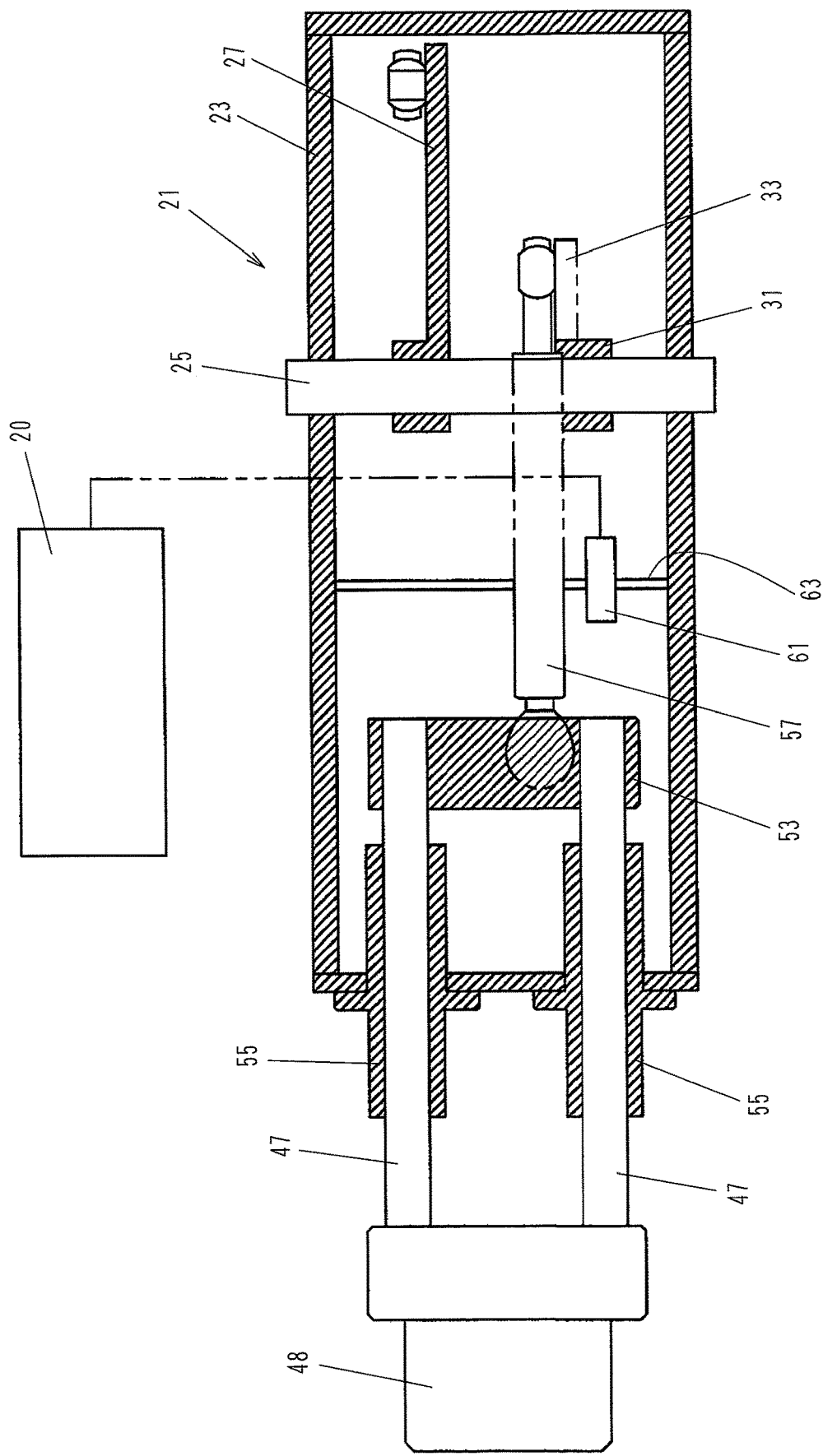
FIG. 3 is a sectional view taken along the line A-A in FIG. 2.
Figure 4:
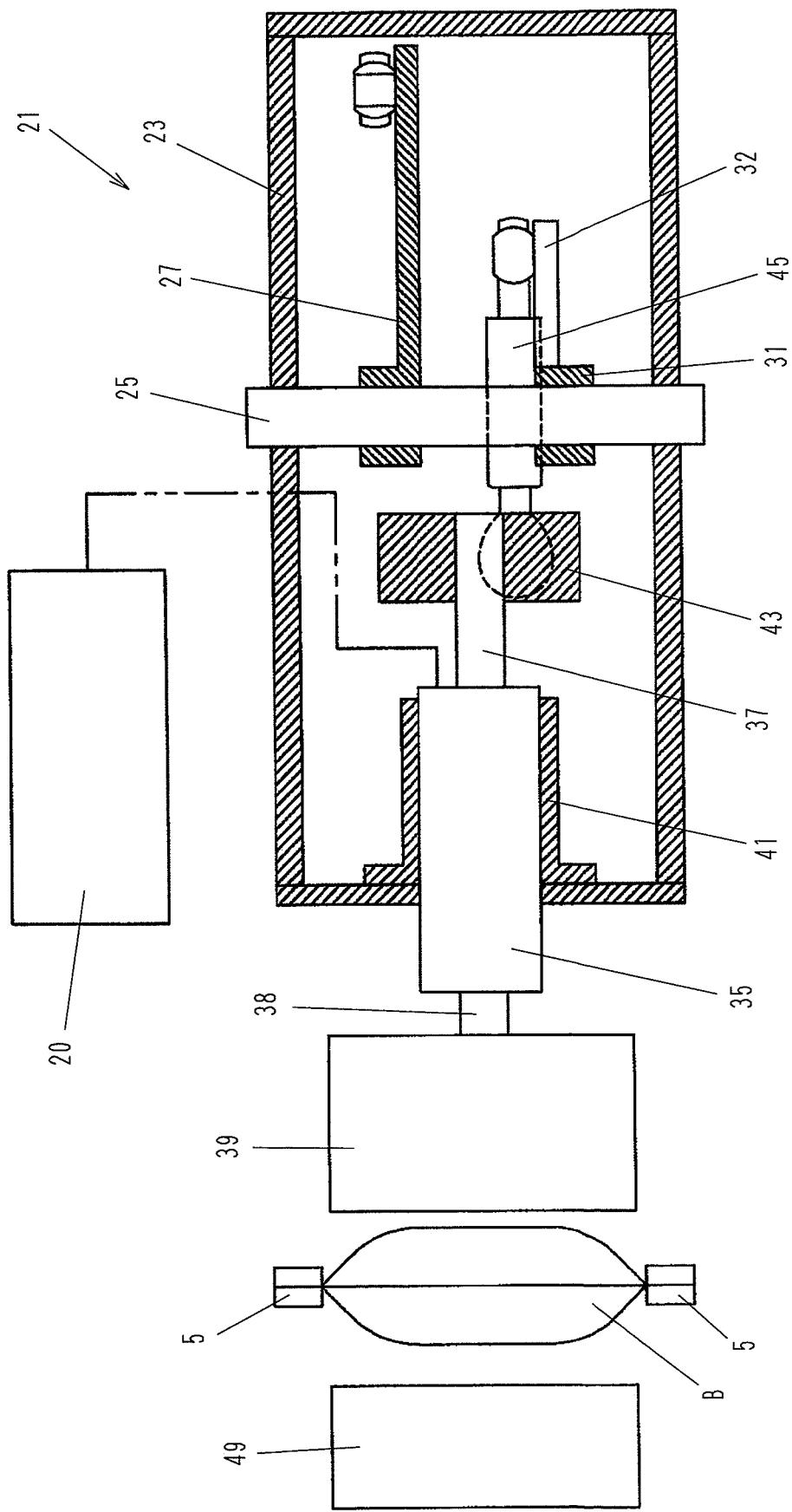
FIG. 4 is a sectional view taken along the line B-B in FIG. 2.

Next, the sealing apparatus 21 according to a first embodiment of the present invention will be explained in detail with reference to FIGS. 2 to 6. FIG. 2 is a sectional side view showing the structure of the sealing apparatus 21, illustrating the sealing apparatus 21 when a bag B filled with a material to be packed at the previous step has moved to and stopped at the station VI. At this time, the sealing apparatus 21 has not yet been activated. FIGS. 3 and 4 are sectional views taken along the lines A-A and B-B, respectively, in FIG. 2.

It should be noted that, in the following embodiments of the present invention, the bag B is ultrasonically sealed along the edge of the bag mouth b. The reason for this is as follows. Ultrasonic sealing has the advantage of being capable of preventing biting of foreign matter, as has been stated above. However, if the bag B is ultrasonically sealed at a position away from the edge of the bag mouth b, the bag mouth b is open above the sealed portion; therefore, dust or other contamination is likely to enter the open portion of the bag mouth b while the bag B is being displayed as an article of merchandise. Such a problem will not occur if the bag B is sealed along the edge of the bag mouth b. It should be noted that, when the bag B is ultrasonically sealed along the edge of the bag mouth b, the bag filling and packaging machine does not carry out the decorative sealing step using the hot plates 15 and the cooling step using the cooling plates 17 among the steps shown in FIG. 1. It is, however, a matter of course that the present invention is also applicable to a packaging machine in which the bag B is ultrasonically sealed at a portion below the edge of the bag mouth b. In such a case, heat sealing (decorative sealing) is applied to an unsealed portion of the bag B extending from the edge of the bag mouth b to a position at which the bag B has been ultrasonically sealed, and thereafter, the heat-sealed portion of the bag B is cooled. If products to be packaged are limited to those which are to be ultrasonically sealed along the edge of the bag mouth, it is unnecessary to provide the decorative sealing device having the pair of hot plates 15 at the station VII and the cooling device having the pair of cooling plates 17 at the station VIII, which have been explained above.

In the figures, reference numeral 25 denotes a driving shaft for driving a horn 39 and an anvil 49, which will be explained later. The driving shaft 25 is rotatably attached to a box-shaped frame 23 secured to a machine base 22. The driving shaft 25 extends horizontally in the frame 23. Reference numeral 27 denotes an oscillating lever disposed in the frame 23. The oscillating lever 27 is attached at one end thereof to the driving shaft 25 so as to be rotatable together with the driving shaft 25 as one unit. The other end of the oscillating lever 27 is connected to a driving rod 29 connected to a drive source (not shown), e.g. a cam mechanism, such that the oscillating lever 27 and the driving rod 29 are rotatable relative to each other. The driving rod 29 is connected to the drive source through a buffer device (not shown), e.g. an air cylinder. The driving rod 29 is driven by the drive source to reciprocate substantially in the axial direction thereof. The driving shaft 25 further has a forked lever 31 secured thereto so as to be rotatable together with the driving shaft 25 as one unit. The forked lever 31 has a first arm 32 and a second arm 33 which open relative to each other at a predetermined angle, as illustrated in the figure. Accordingly, when the driving rod 29 moves reciprocatingly through a certain distance, the motion of the driving rod 29 is transmitted to the forked lever 31 through the oscillating lever 27 and the driving shaft 25, causing the forked lever 31 to rotate reciprocatingly within an angle range corresponding to the reciprocating distance.

Reference numeral 35 denotes a vibrator having a tubular casing 36 supported by a tubular guide 41 secured to the frame 23 such that the casing 36 is movable in a horizontal axial direction. A mounting shaft 37 is secured to the rear end of the casing 36. A first mounting block 43 is secured to the distal end of the mounting shaft 37. A first connecting rod 45 connects between the first mounting block 43 and the distal end of the first arm 32 of the above-described forked lever 31. From the forward end of the casing 36, a booster 38 extends horizontally. The booster 38 outputs ultrasonic vibration generated in the vibrator 35. A horn 39 is secured to the distal end of the booster 38. Accordingly, as the driving rod 29 moves reciprocatingly in the axial direction thereof, the vibrator 35 and the horn 39 move forward and backward as one unit, being guided by the guide 41.

Figure 5:
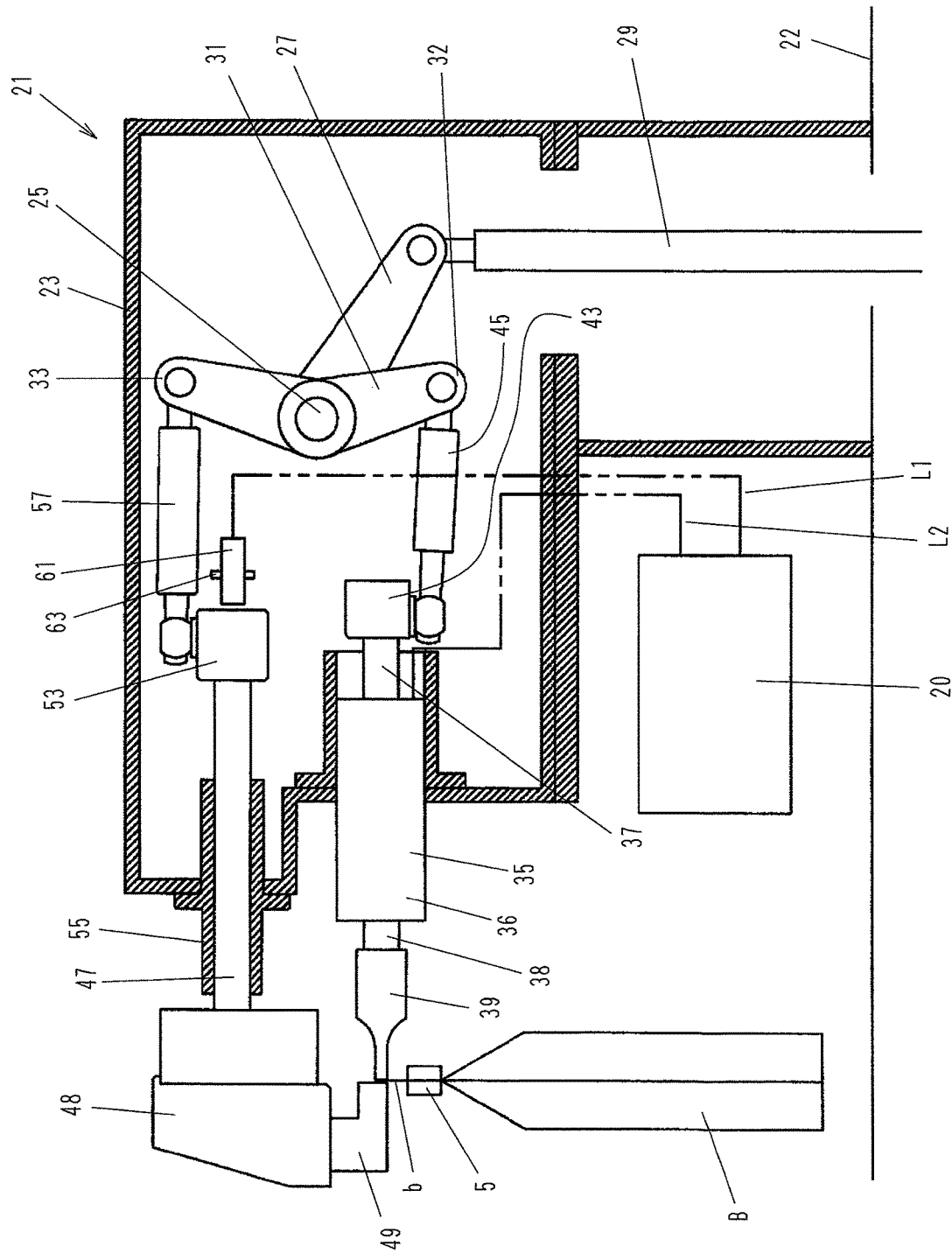
FIG. 5 is a sectional side view of the ultrasonic sealing apparatus when performing an sealing operation.

Reference numeral 47 denotes a sliding shaft extending through a tubular guide 55 secured to the frame 23 and further extending over the inside and outside of the frame 23. The sliding shaft 47 extends above the horn 39 and in the same direction as the axis of the horn 39. A publicly known anvil 49 is secured through an anvil support member 48 to the outer end of the sliding shaft 47, which is located outside the frame 23. The anvil 49 has a pressing surface 50 pressing the bag mouth b of the bag B when sealing the bag mouth b. The pressing surface 50 opposes a pressing surface 40 of the above-described horn 39 at a predetermined distance therebetween. A second mounting block 53 is secured to the inner end of the sliding shaft 47, which is located inside the frame 23. A second connecting rod 57 is rotatably connected at one end thereof to the second mounting block 53. The other end of the second connecting rod 57 is rotatably connected to the distal end of the second arm 33 of the forked lever 31. Accordingly, as the driving rod 29 moves reciprocatingly in the axial direction thereof, the anvil 49 moves, being guided by the guide 55, forward or backward in a direction opposite to the direction of movement of the horn 39. More specifically, as the forked lever 31 rotates clockwise in FIG. 2, the horn 39 and the anvil 49 move toward each other to respective positions where the horn 39 and the anvil 49 abut against each other with the bag B held therebetween, as shown in FIG. 5. As the forked lever 31 rotates counterclockwise, the horn 39 and the anvil 49 move away from each other to retract to respective standby positions shown in FIG. 2. It should be noted that, in this embodiment, there are two sliding shafts 47 provided to extend parallel to each other in the same horizontal plane, as shown in FIG. 3.

Reference numeral 61 denotes a sensor installed at a predetermined position in the frame 23 through a mounting bracket 63. In this embodiment, a proximity sensor is used as the sensor 61. The sensor 61 detects the position of the second mounting block 53 in the axial direction of the sliding shaft 47, to which the second mounting block 53 is secured. A line L1 from the control unit 20 is connected to the sensor 61. A line L2 connects an ultrasonic oscillator (not shown) disposed in the control unit 20 to the vibrator 35. The control unit 20 controls the operation of the vibrator 35 on the basis of a signal from the sensor 61.

Figure 6:
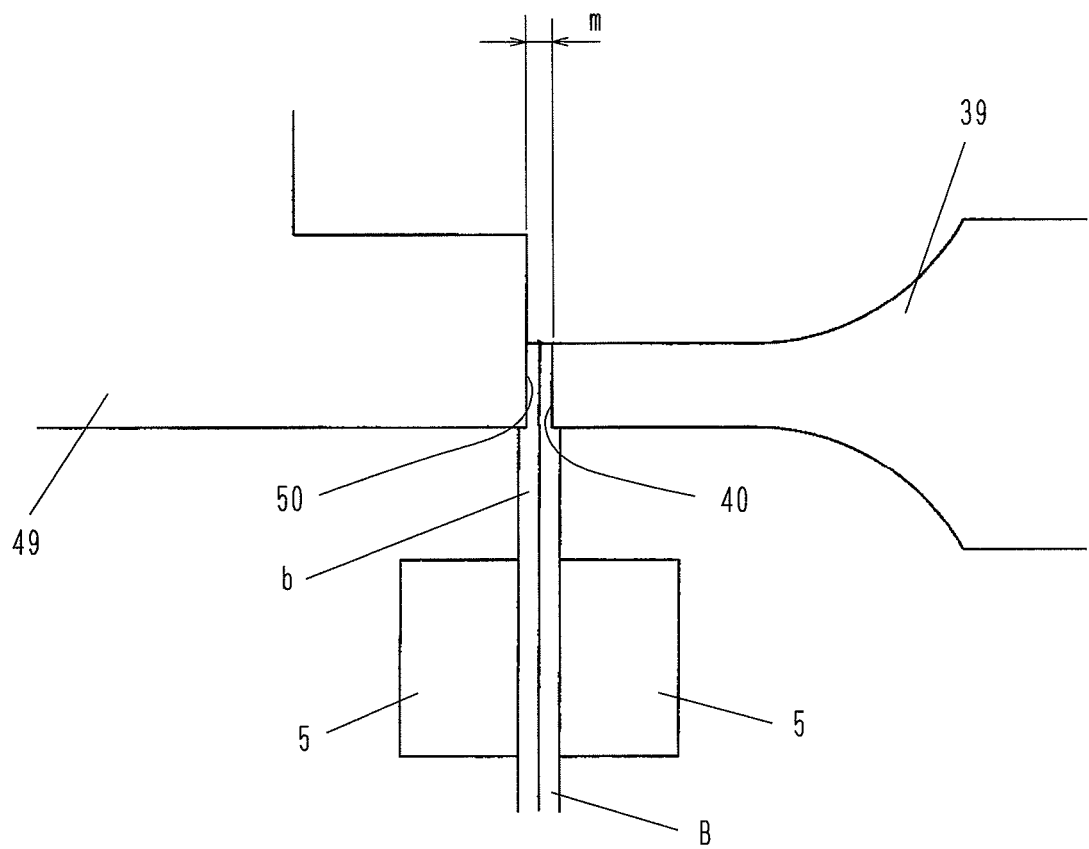
FIG. 6 is a fragmentary enlarged view showing the way in which a horn and an anvil hold and press the mouth of a bag therebetween.

Next, the operation of the sealing apparatus 21 will be explained with reference also to FIGS. 5 and 6. The sealing apparatus 21 is standing by in the position shown in FIG. 2. When a bag B having been filled with a material to be packed at the previous step moves to and stops at the station VI (sealing step), the driving rod 29 is moved axially downward in FIG. 2 at predetermined timing by the operation of the drive source. Consequently, the forked lever 31 rotates clockwise in FIG. 2, causing the horn 39 and the anvil 49 to move toward each other. Eventually, the horn 39 and the anvil 49 stop when abutting against each other with the mouth b of the bag B held therebetween, as shown in FIG. 5. At this time, the position of the second mounting block 53 has already been detected with the sensor 61. This means that detection has already been performed to determine the distance m between the pressing surface 40 of the horn 39 and the pressing surface 50 of the anvil 49, i.e. the thickness m of the portion of the mouth b of the bag B held between the horn 39 and the anvil 49 (see FIG. 6). That is, the respective standby positions of the horn 39 and the anvil 49, which are shown in FIG. 1, are predetermined, and both the horn 39 and the anvil 49 are moved by the forked lever 31 simultaneously in linkage with each other by a distance corresponding to the angle of rotation of the forked lever 31. Therefore, it is possible to detect the thickness m of the portion of the bag mouth b held between the horn 39 and the anvil 49 by detecting the position of the second mounting block 53. It should be noted that the object to be detected is not limited to the second mounting block 53. For example, the position of the first mounting block 43 may be detected to detect the thickness m of the portion of the bag mouth b held between the horn 39 and the anvil 49. As a matter of course, the distance between the pressing surface 40 of the horn 39 and the pressing surface 50 of the anvil 49 may be measured directly to detect the thickness m of the portion of the bag mouth b held between the horn 39 and the anvil 49.

As has been stated above, in this embodiment, detection is performed to determine the distance between the pressing surface 40 of the horn 39 and the pressing surface 50 of the anvil 49 when the bag mouth b is held between the horn 39 and the anvil 49, i.e. the thickness m of the portion of the bag mouth b held between the pressing surface 40 of the horn 39 and the pressing surface 50 of the anvil 49, and the sealing apparatus 21 is controlled on the basis of the value of the detected thickness m. In other words, the present invention has been made on the basis of the knowledge that the value of the thickness m varies according to where (position) or how (posture) the mouth b of the bag B lies between the horn 39 and the anvil 49. This will be explained below.

As has been stated above, the horn 39 and the anvil 49 are driven by the drive source (not shown) through the air cylinder (not shown), which serves as a buffer device, and further through the driving rod 29 to abut against each other with the bag B held therebetween. In this regard, pressing force with which the horn 39 and the anvil 49 abut against each other is set to a fixed value for bags of the same dimensions. Accordingly, the thickness of a portion of the mouth b of the bag B held and pressed between the horn 39 and the anvil 49 varies according to where (position) or how (posture) the mouth b of the bag B lies between the horn 39 and the anvil 49. That is, when the bag B is held with the grippers 5 at a desired position and in a desired posture, the bag mouth b is pressed between the horn 39 and the anvil 49 over a width range preset in the longitudinal direction of the bag B, more specifically, over a width range determined by the dimensions of the respective pressing surfaces 40 and 50 of the horn 39 and the anvil 49, and compressed by an amount corresponding to a certain thickness. Let F represent the surface pressure applied to the pressed portion of the bag B by the horn 39 and the anvil 49 when the bag mouth b is pressed over the above-described width range. In this regard, if the bag B is displaced downward relative to the grippers 5 in the course of moving the bag B, for example, and, consequently, the edge of the bag mouth b lies below the upper edge of the pressing surface 40 of the horn 39, for example, then the width over which the bag mouth b is held between the horn 39 and the anvil 49 narrows, and the surface pressure becomes higher than F. Accordingly, the pressed portion of the bag B is more compressed, and the thickness of the pressed portion of the bag B becomes thinner than in the above-described case. Consequently, the pressing surfaces 40 and 50 come closer to each other than in the above-described case where the bag B is held with the grippers 5 at a desired position and in a desired posture. If the thickness m becomes excessively thin, the bag B no longer functions as a buffer when the horn 39 ultrasonically vibrates, which will exert an unfavorable influence on the sealing apparatus 21, as has been stated above. When the bag B slips off the grippers 5 and, consequently, the horn 39 and the anvil 49 abut directly against each other, there may be a damage, etc., to the anvil 49 and other components of the sealing apparatus 21.

Therefore, in this embodiment, the value m is detected, and if the detected value m is less than a predetermined threshold value M, it is judged that the bag mouth b is not in a sealing enable position, and the vibrator 35 is not activated. More specifically, the threshold value M is determined to be a thickness with which the portion of the bag mouth b held between the horn 39 and the anvil 49 can sufficiently function as a buffer against ultrasonic vibration. That is, the threshold value M to be selected is a lower-limit value of thickness with which the held portion of the bag mouth b will not exert any adverse effect on the sealing apparatus 21. If the detected value m is not less than the threshold value M, the bag mouth b is in the sealing enable position, whereas, if the detected value m is less than the threshold value M, the bag mouth b is not in the sealing enable position. According to whether or not the bag mouth b is in the sealing enable position, there is a difference in the amount of movement of the horn 39 and the anvil 49, i.e. the amount of movement of the driving rod 29, with respect to the same amount of movement of the drive source side. The difference in the amount of movement is absorbed by the above-described air cylinder serving as a buffer device. That is, the rod of the air cylinder serving as a buffer device is normally in a contracted state. As the detected value m increases, the amount of controlled movement of the horn 39 and the anvil 49 increases, and the amount of extension of the rod of the air cylinder increases correspondingly. Accordingly, as compared to a case where the bag B is in a normal state and the value m is not less than the threshold value M, when the amount of compression increases due to displacement of the bag B or the like and, consequently, the value m becomes less than the threshold value M, the amount of extension of the air cylinder rod decreases. When the bag B is not held between the horn 39 and the anvil 49, the rod does not extend at all.

The sensor 61 switches from an off-state to an on-state to generate a signal when the detected distance m becomes less than the predetermined threshold value M. The signal from the sensor 61 is input to the control unit 20. The control unit 20 judges whether the sensor 61 is in the on-state or the off-state at predetermined timing. When the sensor 61 is in the off-state, i.e. when the detected value m is not less than the threshold value M, it is judged that the bag mouth b is in the sealing enable position, and the ultrasonic oscillator in the control unit 20 oscillates ultrasonic waves, causing the vibrator 35 to be ultrasonically vibrated for a predetermined period of time. The ultrasonic vibration of the vibrator 35 is transmitted to the horn 39 after being amplified through the booster 38, causing the horn 39 to be ultrasonically vibrated with a predetermined amplitude. Consequently, frictional heat is generated at the portion of the mouth b of the bag B held between the horn 39 and the anvil 49, and the bag mouth b is sealed by the heat, as is publicly known. Thereafter, the horn 39 and the anvil 49 are moved in the respective directions opposite to the above to return to the standby positions shown in FIG. 2. The bag B is moved to the subsequent station VII (heat sealing step).

When the sensor 61 is in the on-state, i.e. when the detected value m is less than the threshold value M, it is judged that the bag mouth b is not in the sealing enable position, and the control unit 20 does not vibrate the vibrator 35. The horn 39 and the anvil 49 are returned to the respective standby positions shown in FIG. 2 without applying ultrasonic sealing to the bag B. The bag B is discharged as a defective onto a defective collecting chute (not shown).

Although in the above-described embodiment only the lower limit threshold value is set, an upper limit threshold value may also be set. If an upper limit threshold value is set, it is possible to detect a situation in which two bags B are mistakenly fed and gripped together in a superimposed state, for example, and to prevent the superimposed bags B from being sealed. It is also possible to detect a situation in which the bag mouth b is undesirably folded and a bag mouth portion folded double is held between the horn 39 and the anvil 49.

Figure 7:
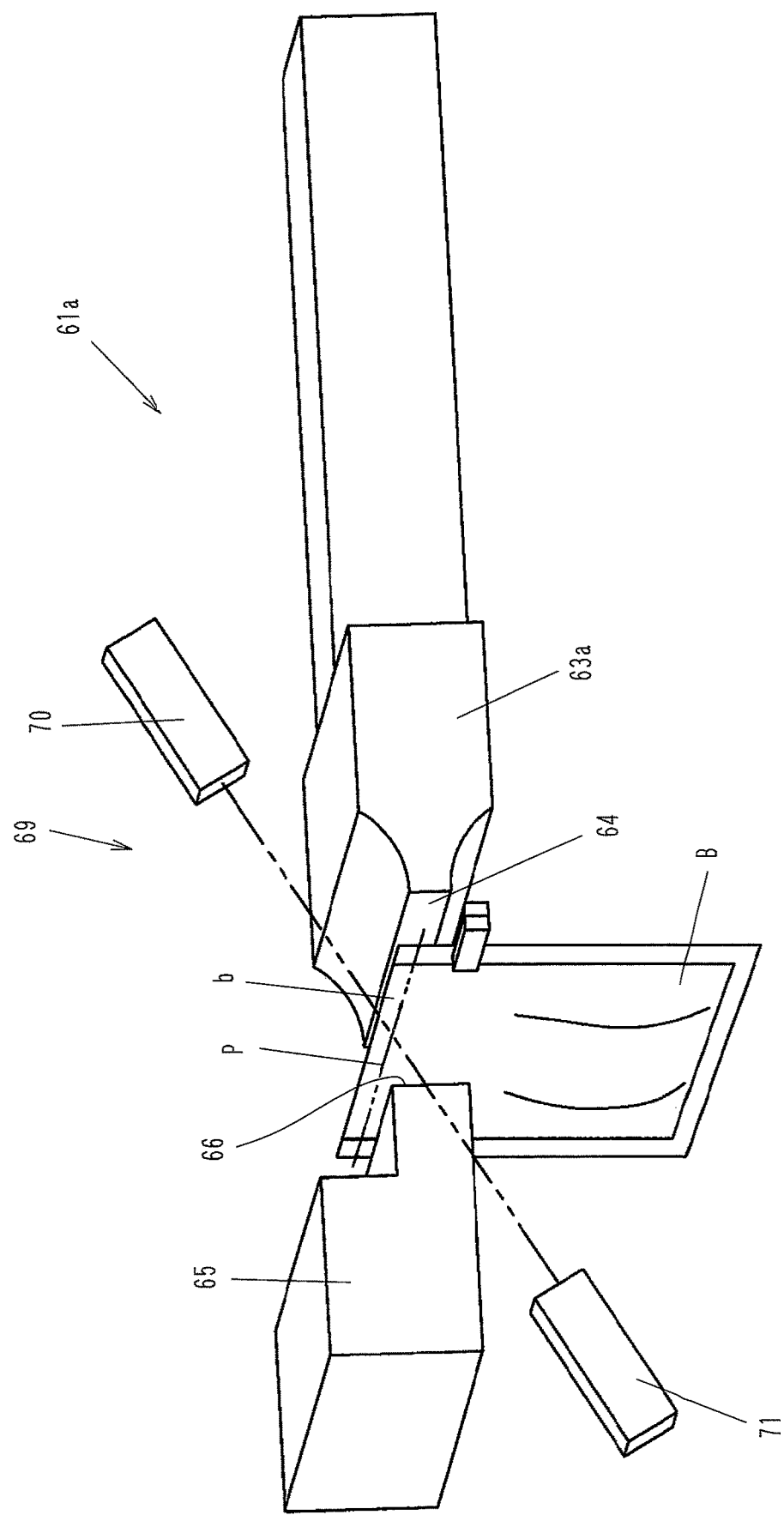
FIG. 7 is a fragmentary perspective view showing the way in which detection is performed by a sensor used in a second embodiment of the present invention.

FIG. 7 is a perspective view showing only an important part of an ultrasonic sealing apparatus 61 according to a second embodiment of the present invention. Reference numerals 63a and 65 denote a horn and an anvil having pressing surfaces 64 and 66, respectively. Unlike the first embodiment, the second embodiment is arranged to perform a detecting operation using a sensor before a bag B is held between the horn 63a and the anvil 65, for example, when the horn 63a and the anvil 65 are at the respective standby positions shown in FIG. 2 in the first embodiment. In the second embodiment, the object to be detected is not the thickness of the portion of the bag held between the horn and the anvil but the position of the bag in the up-and-down direction.

In the second embodiment, a sensor 69 is a photosensor comprising a light-emitting device 70 and a light-receiving device 71. The light-emitting device 70 and the light-receiving device 71 are disposed at the following positions, respectively. Assuming a case where the value m detected when the bag mouth b is pressed with a predetermined force by the horn 63a and the anvil 65 coincides with the threshold value M, as has been stated in the foregoing first embodiment, the light-emitting device 70 and the light-receiving device 71 are disposed so that, in the above-described case, light emitted from the light-emitting device 70 is received by the light-receiving device 71 after passing through a position P in the longitudinal (height) direction of the bag B at which the edge of the bag mouth b lies before the bag mouth b is held between the horn 63a and the anvil 65. The amount of light emitted from the light-emitting device 70 and received by the light-receiving device 71 differs according to whether or not the light passes through the bag B. Therefore, it is possible to judge whether or not the bag B is present at the position P from the amount of light the light-receiving device 71 receives. When the amount 1 of received light is less than a predetermined threshold value L, this shows that the light has passed through the bag B, and this in turn shows that the edge of the bag mouth b lies at or above the position P, and that a width over which the bag mouth b is to be held between the horn 63a and the anvil 65 will be sufficient, and further that, if the bag mouth b is pressed, the gap between the horn 63a and the anvil 65, i.e. the thickness m of the pressed portion of the bag mouth b, will be not less than the threshold value M. In this case, the horn 63a and the anvil 65 are activated to press against each other with the bag mouth b held between, and ultrasonic waves are generated to seal the bag mouth b.

Conversely, when the amount of received light is not less than the threshold value L, this shows that the edge of the bag mouth b lies below the position P, or that the bag B itself is not present, and this in turn shows that, if the bag mouth b is held and pressed between the horn 63 and the anvil 65, the thickness m of the held portion will be less than the threshold value M. Therefore, in this case, the horn 63a and the anvil 65 are not activated, and thus sealing is not performed. It should be noted that two or more sensors 69 may be provided in the lateral (width) direction of the bag B.

In this example, unlike in the first embodiment, detection is performed with the sensor 69 before the bag B is held between the horn 63a and the anvil 65, and when it is judged that the bag mouth b is in the sealing enable position, the horn 63a and the anvil 65 are moved toward each other to press the bag B. In this case, because the bag B is at rest being held with the grippers 5, there will be substantially no change in the position or posture of the bag B during the detection with the sensor 69. Therefore, whether or not to perform sealing is decided on the basis of an accurate judgment.

Next, a third embodiment of the present invention will be explained with reference to FIGS. 8 to 11. In the third embodiment, the drive mechanism for moving the horn and the anvil toward and away from each other is the same as in the foregoing first and second embodiments. The third embodiment, however, differs from the first and second embodiments in the anvil mounting structure. In addition, the sensor used in the third embodiment is a detection sensor detecting electrical conduction between the horn and the anvil or a change in electric resistance between the horn and the anvil. It should be noted that members common to the first, second and third embodiments are denoted by the same reference numerals, and that a detailed description thereof is omitted.

Figure 8:
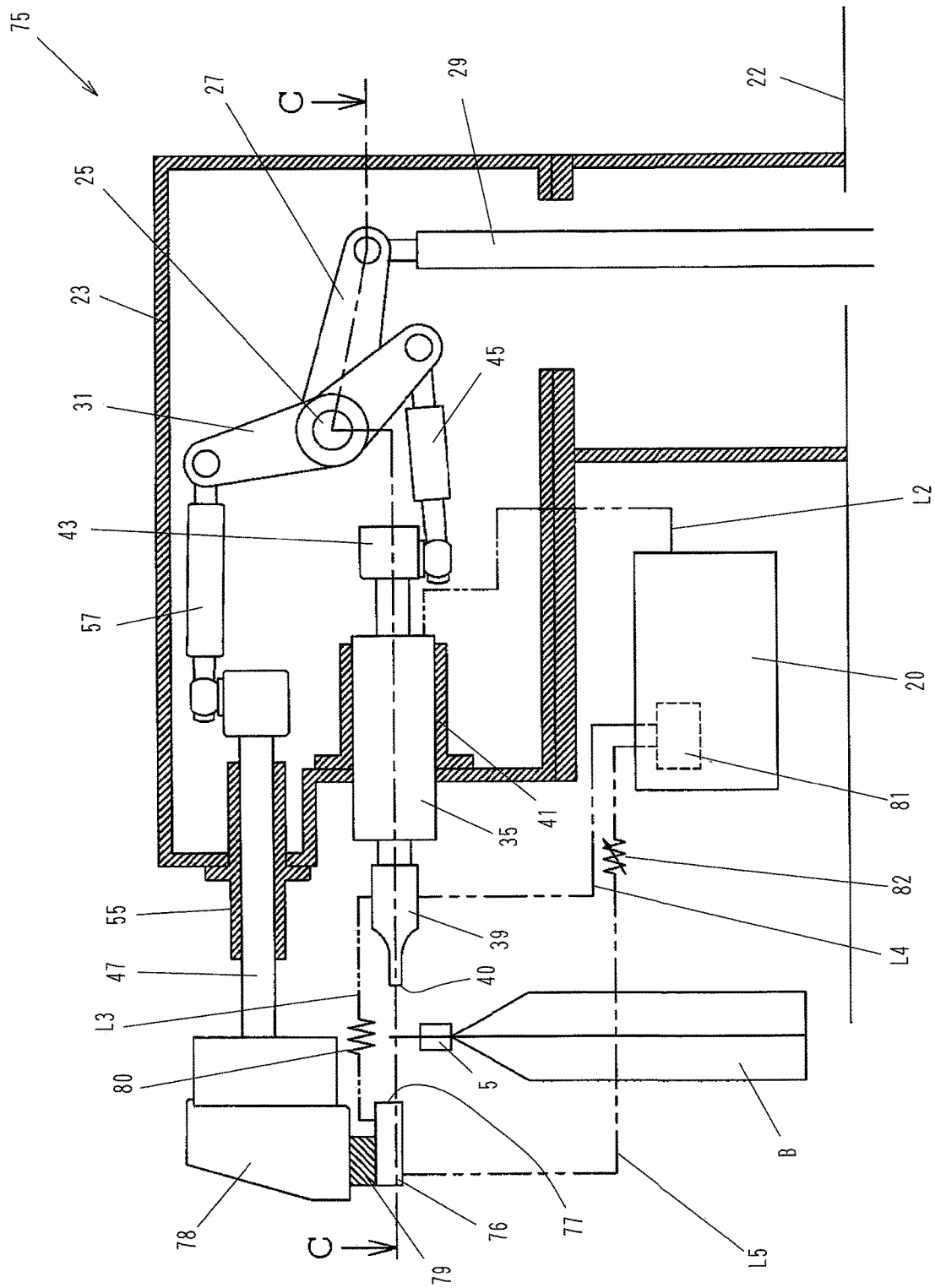
Figure 9:
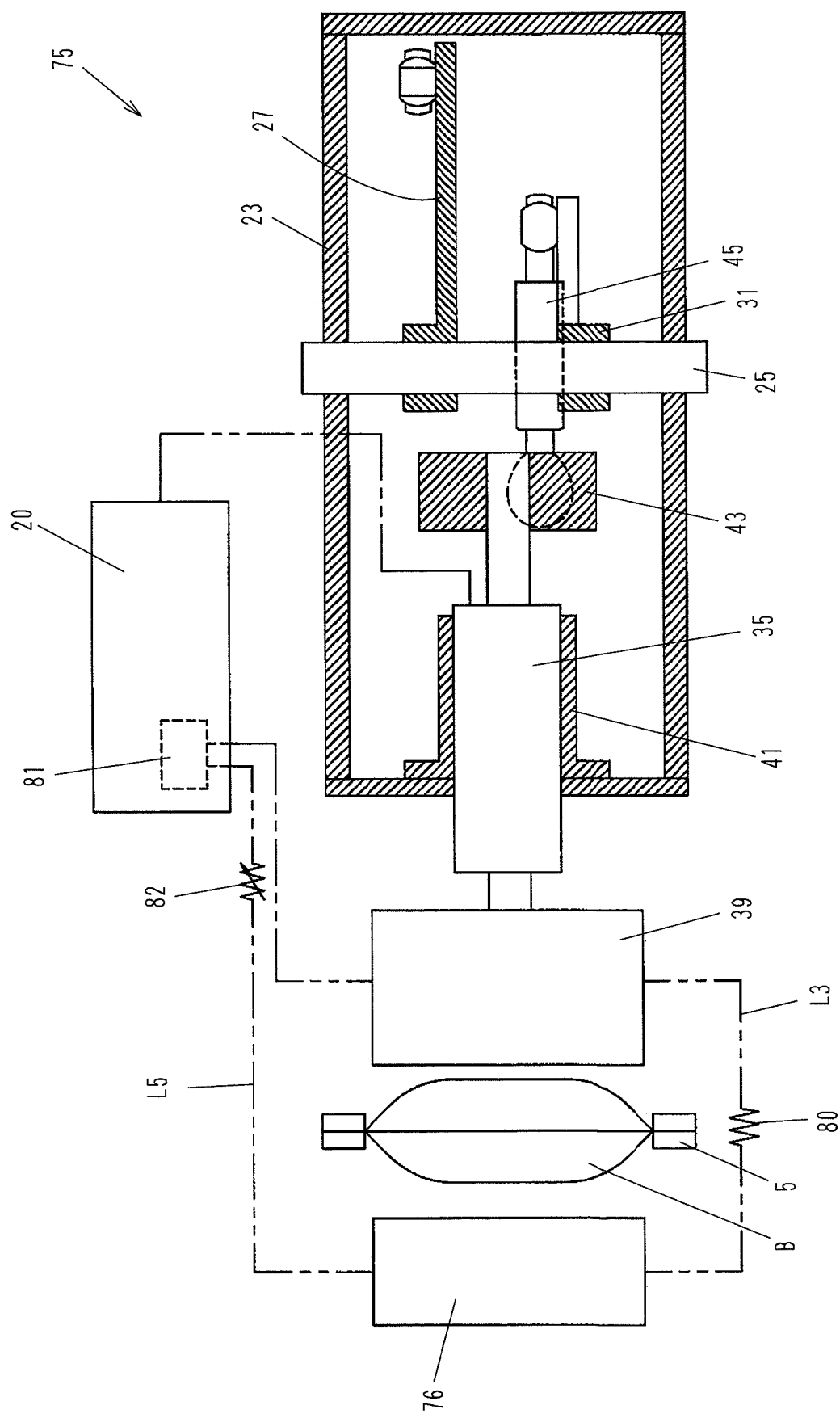
FIG. 9 is a sectional view taken along the line C-C in FIG. 8.

FIG. 8 is a sectional side view of an ultrasonic sealing apparatus 75 according to the third embodiment, showing the ultrasonic sealing apparatus 75 in standby position. FIG. 9 is a sectional view taken along the line C-C in FIG. 8. In the figures, reference numeral 76 denotes an anvil. The anvil 76 is secured through an insulator 79 to the lower side of an anvil support member 78 attached to the distal end of a sliding shaft 47 sliding through the guide 55 secured to the frame 23. The insulator 79 prevents formation of a closed circuit which would otherwise be formed between the anvil 76 and the horn 39 through the anvil support member 78, the sliding shaft 47, the guide 55, the frame 23, and the vibrator 35, or between the anvil 76 and the horn 39 through the anvil support member 78, the sliding shaft 47, the second connecting rod 57, the forked lever 31, the first connecting rod 45, and the vibrator 35, when the pressing surface 40 of the horn 39 and a pressing surface 77 of the anvil 76 directly contact each other. The insulator 79 may also be provided between the anvil support member 78 and the sliding shaft 47, for example. In this case, the sliding shaft 47 is also regarded as a part of the support member supporting the anvil 76, and such a structure shall also be considered to be one in which "the anvil is secured through an insulator to the anvil support member". The insulator 79 is so rigid as not to be readily deformed when the horn 39 and the anvil 76 abut against each other.

In the illustrated example of the third embodiment, the horn 39 and the anvil 76 are connected through a wiring L3, and an electric resistor 80 is installed in the wiring L3 halfway between the horn 39 and the anvil 76. It should, however, be noted that the wiring L3 and the electric resistor 80 are not provided in some embodiments of the present invention. These embodiments will be explained later.

Reference numeral 81 denotes a detection sensor provided in the control unit 20. The detection sensor 81 is connected to the horn 39 and the anvil 76 through wirings L4 and L5, respectively. A variable resistor 82 is installed in the wiring L5 halfway between the detection sensor 81 and the anvil 76. The variable resistor 82 may be installed in the wiring L4. The detection sensor 81 detects, when the horn 39 and the anvil 76 come closest to each other, whether or not the horn 39 and the anvil 76 are electrically conducting to each other, or whether or not there is a change in electric resistance between the horn 39 and the anvil 76. That is, in the illustrated example in which the wiring L3 and the electric resistor 80 are provided, a closed circuit is formed, when the system is in the illustrated state, by the horn 39, the wiring L3, the anvil 76, the wiring L5, the detection sensor 81, and the wiring L4, and the electric resistance included in the closed circuit comprises the electric resistor 80 and the variable resistor 82 connected in series. If the horn 39 and the anvil 76 move toward each other from the illustrate state and the respective pressing surfaces 40 and 77 contact each other, the horn 39 and the anvil 76 are connected in parallel to each other, namely through a conducting line formed by the pressing surfaces 40 and 77 contacting each other and through another conducting line formed by the wiring L3 and the electric resister 80, causing a change in the overall resistance value of the circuit. The detection sensor 81 detects the change in the resistance value. In the structure in which the wiring L3 and the electric resistor 80 are not provided, the detection sensor 81 detects whether or not the horn 39 and the anvil 76, which are normally not directly conducting to each other, are directly conducting to each other.

It should be noted that the electric resistor 80 functions as a disconnection detecting device detecting whether or not there is a disconnection in either of the wirings L4 and L5. That is, if any of the wirings L3, L4 and L5 is disconnected in the illustrated state, the illustrated closed circuit becomes an open circuit, and the resistance value detected by the detection sensor 81 becomes infinite (i.e. the resistance value changes). Thus, it is detected that there is a disconnection in at least one of the wirings L3, L4 and L5.

FIGS. 8 and 9 show a state where the bag B has moved to the sealing step. In the illustrated state, the ultrasonic sealing apparatus 75 has not yet started its operation but is standing by. The resistance value the detection sensor 81 detects at this time is the sum total of the resistances of the electric resistor 80 and the variable resistor 82, which is a criterion for judging whether or not there is a change in resistance value. In the structure in which the wiring L3 and the electric resistor 80 are not provided, a non-conducting state is detected by the detection sensor 81 at this time.

Figure 10:
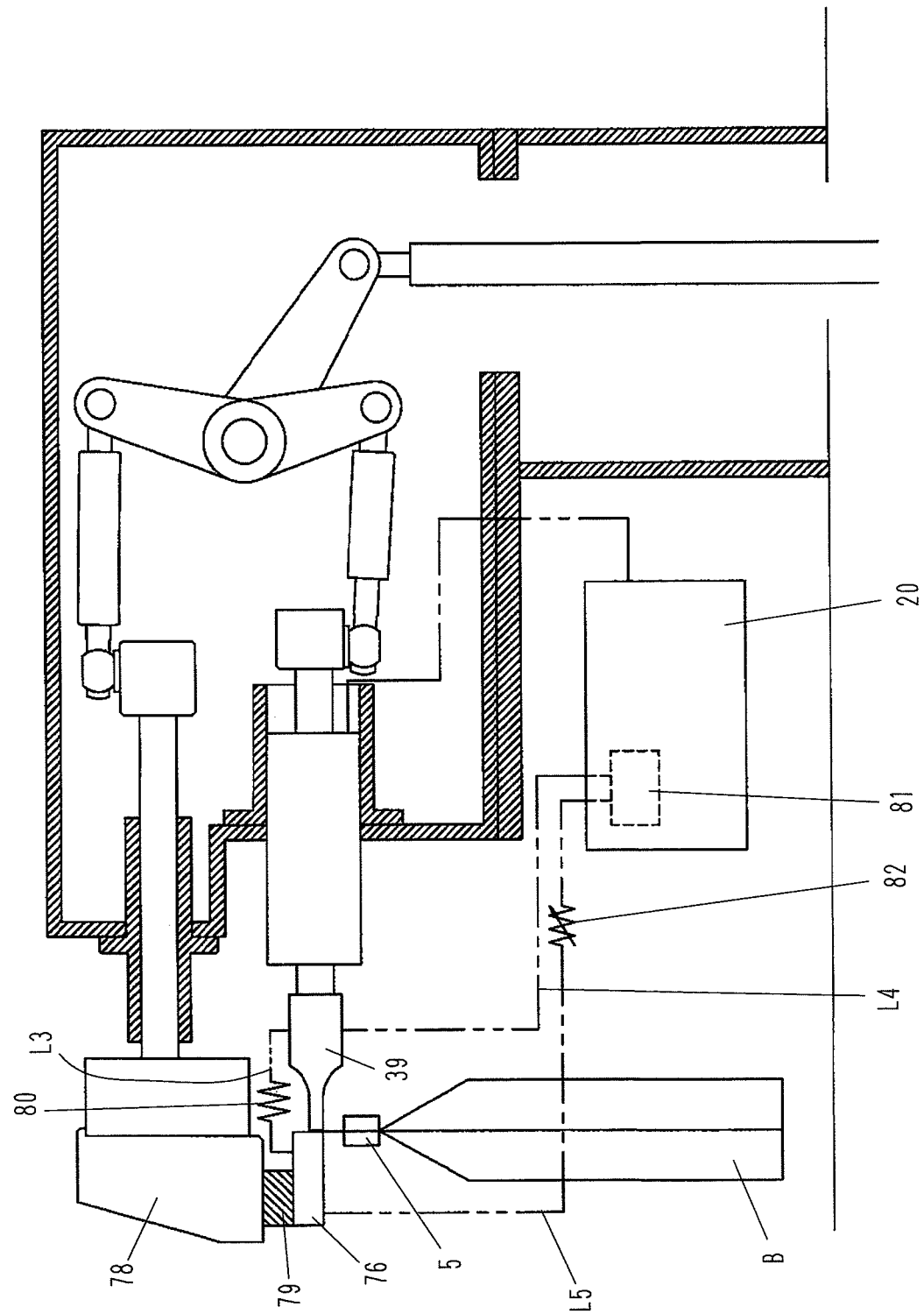
FIG. 10 is a sectional side view of the ultrasonic sealing apparatus according to the third embodiment when the mouth of a bag is in the sealing enable position.

FIG. 10 shows a state where the bag B has been moved to the sealing step, and the horn 39 and the anvil 76 have moved through a predetermined distance to come closest to each other to hold the mouth of the bag B between the respective pressing surfaces 40 and 77. That is, the mouth of the bag B lies in a normal position between the horn 39 and the anvil 76. Vibration of the horn 39 has not yet started. At this time, because the bag mouth is present between the horn 39 and the anvil 76, the horn 39 and the anvil 76 are not in direct contact with each other. Accordingly, in the structure in which the wiring L3 is not provided, non-conduction is detected by the detection sensor 81. In the structure in which the wiring L3 is provided, there is no change in the resistance value, and this is detected by the detection sensor 81. Receiving the detection result, the control unit 20 judges that the mouth of the bag B is in the sealing enable position, and controls the system to apply ultrasonic vibration to the horn 39.

Figure 11:
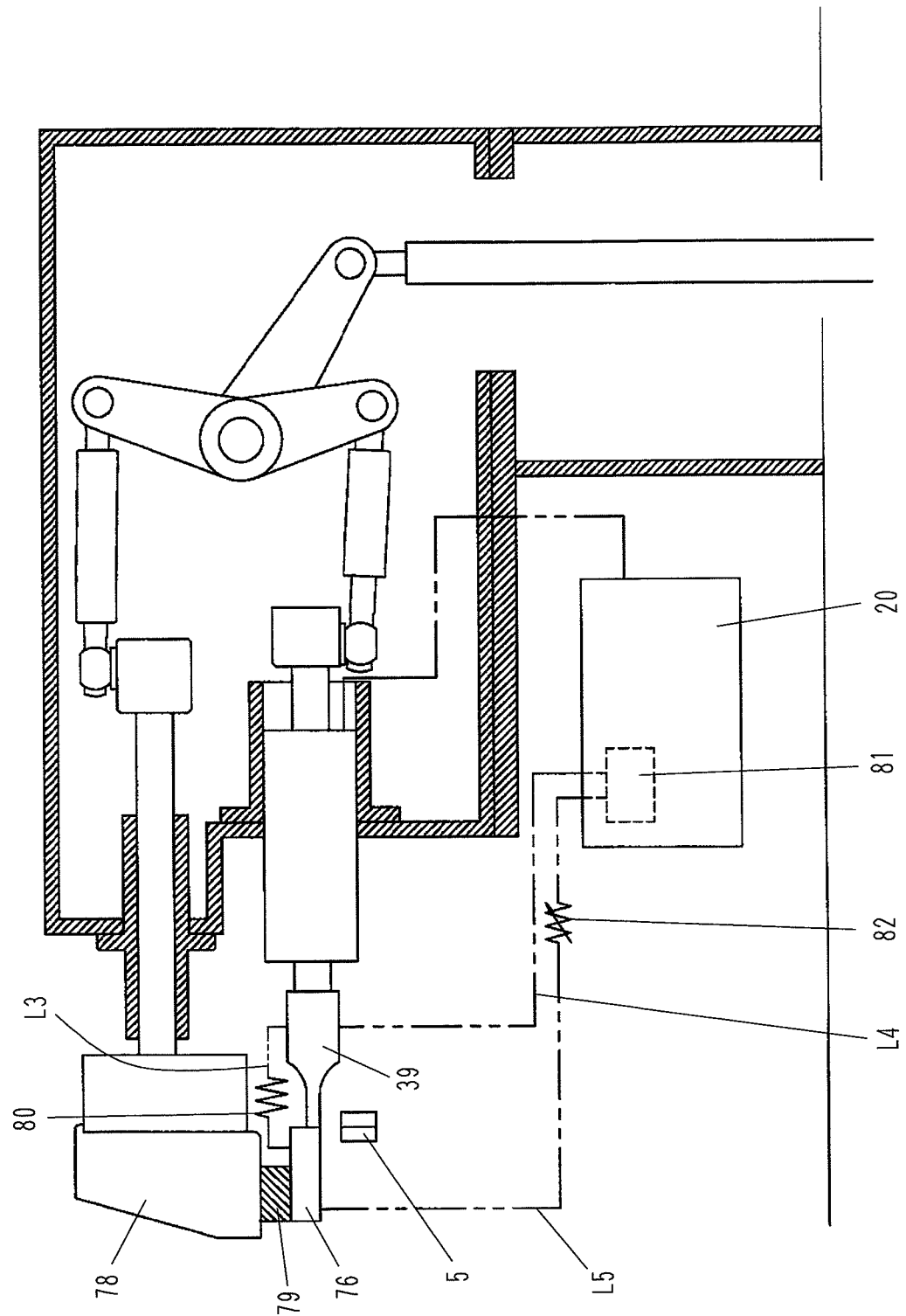
FIG. 11 is a sectional side view of the ultrasonic sealing apparatus according to the third embodiment when the mouth of a bag is not in the sealing enable position.

FIG. 11 shows a state where the bag B has slipped off the grippers 5 undesirably and, consequently, the mouth of the bag B does not lie in a normal position between the horn 39 and the anvil 76. Vibration of the horn 39 has not yet started. At this time, because the bag mouth is not present between the horn 39 and the anvil 76, the horn 39 and the anvil 76 are in direct contact with each other. Accordingly, in the structure in which the wiring L3 is not provided, the detection sensor 81 detects that the horn 39 and the anvil 76 are conducting to each other. In the structure in which the wiring L3 is provided, there is a reduction in the resistance value because the circuit elements between the horn 39 and the anvil 76 are connected in parallel to each other, and the change in resistance value is detected by the detection sensor 81. Receiving the detection result, the control unit 20 judges that the mouth of the bag B is not in the sealing enable position, and controls the systems not to apply ultrasonic vibration to the horn 39, thereby preventing an "idle sealing" operation.

Let us assume that, in the structure in which the wiring L3 is provided, there is a disconnection in the above-described closed circuit, particularly in at least one of the wirings L3, L4 and L5. When the horn 39 and the anvil 76 come closest to each other with the bag B lying in a normal position between the horn 39 and the anvil 76 (FIG. 10), the resistance value becomes infinite if there is a disconnection in any of the wirings L3, L4 and L5. When the horn 39 and the anvil 76 come closest to each other to contact each other with no bag B present between the horn 39 and the anvil 76 (FIG. 11), the resistance value becomes infinite if there is a disconnection in either of the wirings L4 and L5. If the wiring L3 is disconnected, the resistance included in the closed circuit is only the variable resistor 82, and the overall resistance value reduces. Accordingly, in either case, the resistance value changes if there is a disconnection. In all such cases, the control unit 20 judges that the mouth of the bag B is not in the sealing enable position, and controls the system not to apply ultrasonic vibration to the horn 39. It should be noted that, even when the horn 39 and the anvil 76 are separate from each other, if any of the wirings L3, L4 and L5 is disconnected, the resistance between the horn 39 and the anvil 76 becomes infinite at this point of time. Therefore, the control unit 20 may be configured to judge, at that point of time, that the mouth of the bag B is not in the sealing enable position. The control unit 20 may also be configured to issue an alarm when making such a judgment and to stop the packaging machine 1.

Figure 12:
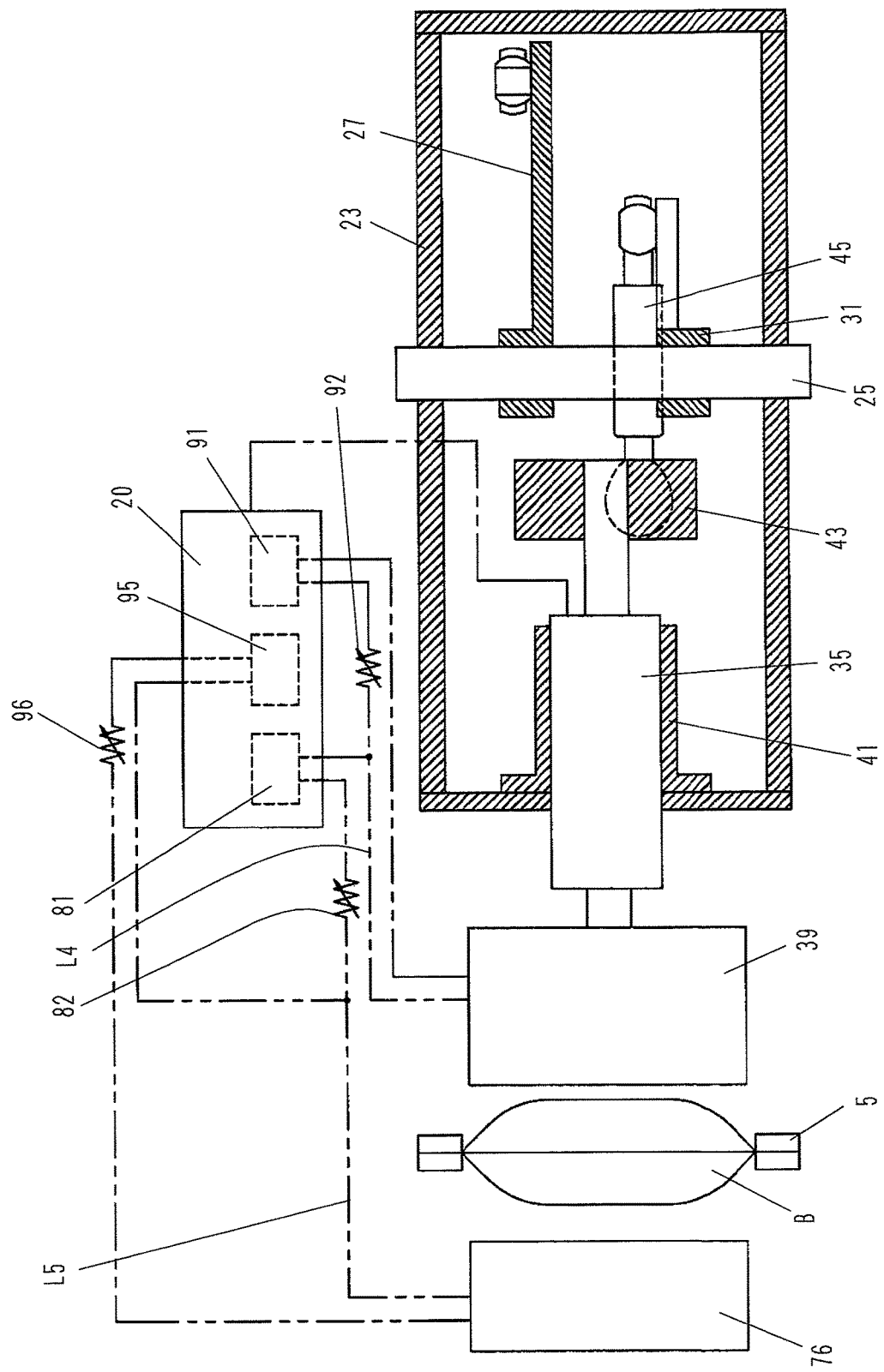
FIG. 12 is a sectional plan view of an ultrasonic sealing apparatus according to a fourth embodiment of the present invention.

FIG. 12 is a sectional view taken along the line C-C in FIG. 8, showing a fourth embodiment of the present invention. In the fourth embodiment, a horn-side disconnection confirming sensor 91 and an anvil-side disconnection confirming sensor 95 are provided in place of the resistor installed in the wiring L3 as a disconnection detecting device in the third embodiment. More specifically, the horn-side disconnection confirming sensor 91 is connected between the horn 39 and the wiring L4 electrically connecting the horn 39 and the detection sensor 81 at a position halfway the wiring L4 and closer to the detection sensor 81. The anvil-side disconnection confirming sensor 95 is connected between the anvil 76 and the wiring L5 electrically connecting the anvil 76 and the detection sensor 81 at a position halfway the wiring L5 and closer to the detection sensor 81. It should be noted that variable resistors 92 and 96 are provided, as shown in the figure, to allow adjustment of the sensitivity of both the disconnection confirming sensors 91 and 95.

With the above-described structure, when there is no disconnection, the horn-side disconnection confirming sensor 91 and the anvil-side disconnection confirming sensor 95 detect that both the wirings L4 and L5 are conducting (i.e. the resistance value is small). If a disconnection occurs in the wiring L4 connecting the horn 39 and the detection sensor 81, the horn-side disconnection confirming sensor 91 detects that the conduction between the horn 39 and the detection sensor 81 is cut off (i.e. the resistance value increases), and the control unit 20 judges that the mouth of the bag B is not in the sealing enable position on the basis of the detection signal from the horn-side disconnection confirming sensor 91 irrespective of whether or not there is a detection signal from the detection sensor 81. Then, the control unit 20 controls the system not to apply an ultrasonic signal to the horn 39. If a disconnection occurs in the wiring L5 connecting the anvil 76 and the detection sensor 81, the anvil-side disconnection confirming sensor 95 detects that the conduction between the anvil 76 and the detection sensor 81 is cut off (i.e. the resistance value increases), and the control unit 20 judges that the mouth of the bag B is not in the sealing enable position on the basis of the detection signal from the anvil-side disconnection confirming sensor 95 irrespective of whether or not there is a detection signal from the detection sensor 81. Then, the control unit 20 controls the system not to apply an ultrasonic signal to the horn 39.

Although in each of the foregoing embodiments the present invention has been explained with regard to an example in which ultrasonic sealing is applied to a bag along the edge of the bag mouth, the present invention, as a matter of course, includes an ultrasonic sealing process in which ultrasonic sealing is applied to a bag at a position below the edge of the bag mouth. Although in the foregoing embodiments the present invention has been explained with regard to an example in which the present invention is applied to an intermittently rotating bag filling and packaging machine, the present invention is also applicable to a continuously moving type bag filling and packaging machine. In such a case, the ultrasonic sealing apparatus performs detecting and sealing operations while moving from an initial position over a predetermined range, following the movement of a bag, and thereafter returns to the initial position. In this case, therefore, the term "sealing step position" includes not only the initial position but also the predetermined moving range.

What is claimed is:

1. An ultrasonic sealing apparatus for use in a bag filling and packaging machine in which a bag is held by being gripped at its laterally opposite side edges with a pair of laterally spaced grippers and the bag held in this way is moved along a predetermined path to sequentially undergo predetermined packaging steps, the ultrasonic sealing apparatus comprising:
    an ultrasonic sealing apparatus body having a horn and an anvil which are movable toward and away from each other, the ultrasonic sealing apparatus body being disposed at a predetermined sealing step position in the bag filling and packaging machine;
    a sensor, disposed at the sealing step position, which detects whether or not a mouth of a bag moved to the sealing step position is in a predetermined sealing enable position between the horn and the anvil;
    a control unit controlling the ultrasonic sealing apparatus body on a basis of a signal from the sensor; and
    an anvil support member,
    wherein the anvil is secured, through an insulator, to said anvil support member advancing and retracting relative to the horn;
    the sensor being a detection sensor that is electrically connected to the horn and the anvil through respective wiring to detect electrical conduction between the horn and the anvil or a change in electrical resistance occurring between the horn and the anvil when the horn and the anvil move relative to each other;
    wherein, when the detection sensor does not detect the electrical conduction or a change in the electrical resistance, the control unit judges that the mouth of the bag is in the sealing enable position, and controls the ultrasonic sealing apparatus body to apply ultrasonic vibration to the horn, whereas, when the detection sensor detects the electrical conduction or a change in the electrical resistance, the control unit judges that the mouth of the bag is not in the sealing enable position, and controls the ultrasonic sealing apparatus body not to apply ultrasonic vibration to the horn,
    a disconnection detecting device detecting a disconnection in the wiring connecting the horn and the anvil to the detection sensor;
    wherein, when the disconnection detecting device detects a disconnection in the wiring, the control unit judges that the mouth of the bag is not in the sealing enable position, and controls the ultrasonic sealing apparatus body not to apply ultrasonic vibration to the horn,
    wherein the disconnection detecting device comprises at least one variable resistor,
    the detection sensor is connected to the horn via a first wiring and is connected to the anvil via a second wiring, and
    the variable resistor is provided on at least one of the first wiring and the second wiring.

2. An intermittently rotating bag filling and packaging machine comprising:
    the ultrasonic sealing apparatus of claim 1.

3. The ultrasonic sealing apparatus of claim 1, wherein the horn and the anvil move in linkage with each other.

4. An ultrasonic sealing apparatus for use in a bag filling and packaging machine in which a bag is held by being gripped at its laterally opposite side edges with a pair of laterally spaced grippers and the bag held in this way is moved along a predetermined path to sequentially undergo predetermined packaging steps, the ultrasonic sealing apparatus comprising:
    an ultrasonic sealing apparatus body having a horn and an anvil which are movable toward and away from each other, the ultrasonic sealing apparatus body being disposed at a predetermined sealing step position in the bag filling and packaging machine;
    a sensor, disposed at the sealing step position, which detects whether or not a mouth of a bag moved to the sealing step position is in a predetermined sealing enable position between the horn and the anvil;
    a control unit controlling the ultrasonic sealing apparatus body on a basis of a signal from the sensor; and
    an anvil support member,
    wherein the anvil is secured, through an insulator, to said anvil support member advancing and retracting relative to the horn;
    the sensor being a detection sensor that is electrically connected to the horn and the anvil through respective wiring to detect electrical conduction between the horn and the anvil or a change in electrical resistance occurring between the horn and the anvil when the horn and the anvil move relative to each other;
    wherein, when the detection sensor does not detect the electrical conduction or a change in the electrical resistance, the control unit judges that the mouth of the bag is in the sealing enable position, and controls the ultrasonic sealing apparatus body to apply ultrasonic vibration to the horn, whereas, when the detection sensor detects the electrical conduction or a change in the electrical resistance, the control unit judges that the mouth of the bag is not in the sealing enable position, and controls the ultrasonic sealing apparatus body not to apply ultrasonic vibration to the horn, a disconnection detecting device detecting a disconnection in the wiring connecting the horn and the anvil to the detection sensor;

wherein, when the disconnection detecting device detects a disconnection in the wiring, the control unit judges that the mouth of the bag is not in the sealing enable position, and controls the ultrasonic sealing apparatus body not to apply ultrasonic vibration to the horn;

the disconnection detecting device comprises a resistor, the detection sensor is connected to the horn via a first wiring and is connected to the anvil via a second wiring, and the resistor is electrically connected to the horn and the anvil via a third wiring, the resistor, the horn, the anvil, the detection sensor, and the wiring connecting the horn and the anvil to the detection sensor constituting a closed circuit, and wherein the disconnection detecting device further comprises a variable resistor provided on at least one of the first wiring and the second wiring.

5. The ultrasonic sealing apparatus of claim 1, wherein the disconnection detecting device comprises a resistor electrically connected between the horn and the anvil, the resistor constituting a closed circuit, together with the horn, the anvil, the detection sensor, and the wiring connecting the horn and the anvil to the detection sensor.

6. An intermittently rotating bag filling and packaging machine comprising:

the ultrasonic sealing apparatus of claim 4.

7. The ultrasonic sealing apparatus of claim 4, wherein the horn and the anvil move in linkage with each other.

* * * * *